US010289826B2

(12) United States Patent
Billings et al.

(10) Patent No.: US 10,289,826 B2
(45) Date of Patent: May 14, 2019

(54) USING HIDDEN SECRETS AND TOKEN DEVICES TO CONTROL ACCESS TO SECURE SYSTEMS

(75) Inventors: Roger E. Billings, Independence, MO (US); John A. Billings, Independence, MO (US)

(73) Assignee: CybrSecurity Corporation, Kansas City, MO (US)

( * ) Notice: Subject to any disclaimer, the term of this patent is extended or adjusted under 35 U.S.C. 154(b) by 2 days.

(21) Appl. No.: 12/397,326

(22) Filed: Mar. 3, 2009

(65) Prior Publication Data

US 2010/0228991 A1 Sep. 9, 2010

(51) Int. Cl.
*G06F 21/34* (2013.01)

(52) U.S. Cl.
CPC .................... *G06F 21/34* (2013.01)

(58) Field of Classification Search
CPC ...... H04L 9/0822; H04L 9/0877; G06F 21/34
USPC ............... 713/168, 172, 185, 193; 726/2, 20
See application file for complete search history.

(56) References Cited

U.S. PATENT DOCUMENTS

| 5,227,613 | A  | * | 7/1993  | Takagi et al. ................. 235/380 |
|-----------|-----|---|---------|----------------------------------------|
| 6,067,621 | A  | * | 5/2000  | Yu et al. ....................... 713/172 |
| 6,400,823 | B1 | * | 6/2002  | Angelo ......................... 380/255 |
| 6,606,707 | B1 | * | 8/2003  | Hirota et al. ................. 713/172 |
| 7,000,115 | B2 | * | 2/2006  | Lewis et al. .................. 713/176 |
| 7,010,809 | B2 | * | 3/2006  | Hori et al. ....................... 726/26 |
| 7,032,240 | B1 | * | 4/2006  | Cronce et al. ..................... 726/2 |
| 7,222,783 | B2 | * | 5/2007  | Merrien ........................ 235/380 |
| 7,512,800 | B2 | * | 3/2009  | Hopkins ........................ 713/172 |
| 7,748,031 | B2 | * | 6/2010  | Gonzalez et al. ................. 726/9 |
| 7,844,831 | B2 | * | 11/2010 | Benhammou et al. ....... 713/189 |
| 2003/0212894 | A1 | * | 11/2003 | Buck ........................ G06F 21/34 713/184 |
| 2003/0217270 | A1 | * | 11/2003 | Nakayama .................... 713/172 |

(Continued)

OTHER PUBLICATIONS

Satanik Panda et al., "Generic Algorithm Based Secure Authentication Protocol With Dual Central Server and Token Authentication in Large Scale Mobile Ad-Hoc Networks," 2017 IEEE, pp. 1-6. (Year: 2008).*

(Continued)

*Primary Examiner* — Luu T Pham
*Assistant Examiner* — Canh Le (57) ABSTRACT

A system for using an encrypted version of a password or access code which is stored in the open on a computer or other device, which utilizes a hardware token to decrypt the password or access code utilizing a secure secret which is stored inside the device, and which never leaves the device, to allow the owner of the device to have access to the Secure System. The system also provides means whereby the holder of a Master token and the holder of a Grand Master token may also have access to the Secure System as long as the user token was previously registered to the Master token and the Master Token was previously registered to the Grand master token before the secured resource was locked by the user token. Also the system allows members of user groups so designated at the time the resource is locked, to be able to have access as long as their token was previously registered with the same Master Token as the user that locked the resource and as long as the token locking the resource was also a member of the authorized user group.

11 Claims, 6 Drawing Sheets

(56) References Cited

U.S. PATENT DOCUMENTS

| | | | | |
|---|---|---|---|---|
| 2004/0025021 A1* | 2/2004 | Aikawa | .................. | G06Q 20/06 713/172 |
| 2004/0059916 A1* | 3/2004 | Mizushima et al. | .......... | 713/172 |
| 2004/0255119 A1* | 12/2004 | Ukeda et al. | .................. | 713/169 |
| 2005/0156029 A1* | 7/2005 | Hopkins | ................. | G06F 21/34 235/382 |
| 2005/0283633 A1* | 12/2005 | Kozenitzky | ........... | G06F 21/316 713/600 |
| 2006/0248345 A1* | 11/2006 | Ishidera | ........................ | 713/183 |
| 2007/0061567 A1* | 3/2007 | Day | ...................... | H04L 63/123 713/159 |
| 2007/0118891 A1* | 5/2007 | Buer | ................................ | 726/8 |
| 2008/0046750 A1* | 2/2008 | Fletcher | .................. | G06F 21/34 713/185 |
| 2008/0260146 A1* | 10/2008 | Schroeder | ............ | G07C 15/006 380/46 |
| 2009/0006865 A1* | 1/2009 | Zunke | ....................... | H04L 9/06 713/193 |
| 2009/0319782 A1* | 12/2009 | Lee | ......................... | G06F 21/34 713/156 |
| 2010/0098246 A1* | 4/2010 | Ward | .............................. | 380/44 |

OTHER PUBLICATIONS

Obinna Ethelbert et al., "A JSON Token-Based Authentication and Access Management Schema for Cloud SaaS Applications," 2017 IEEE, pp. 47-53. (Year: 2017).*

* cited by examiner

USING HIDDEN SECRETS AND TOKEN DEVICES TO CONTROL ACCESS TO SECURE SYSTEMS

BACKGROUND OF THE INVENTION

This invention relates to the use of Hidden Secrets and security token devices to control access to Secure Systems, providing a dual factor method of authentication, but doing so in such a manner that the security token can be used to control access to an unlimited number of Secure Systems, each with a unique login password. The invention also provides a system whereby, at the user's discretion, others may also have access to the locked user account.

Traditionally, access to a computer is controlled by software which requires the user to login using a special password already known to the computer. If the password entered by the user matches the password previously registered with the computer, the user is allowed access to the system. Similarly, by entering the correct password, a user can log into a remote storage server where control software determines which files can be read or updated.

More recently, with the need to improve security, some computers require a user to have a hardware device to assist in the login process. This hardware token is usually a "smart card" or a Universal Serial Bus (USB) device. In either case, the security token has the ability to store information or secrets in such a way that they can only be accessed in accordance with the programming inside of the device. In conventional use, the tokens store passwords or certificates used to log into computers and servers. To log in, a user must enter a PIN (Personal Identification Number) associated with the security token. The security token then unloads the secret user password or certificate, and permits login. This security approach is better than just a password since access to the system requires "something you know"—the PIN, and "something you have"—the security token.

State-of-the-art products thus providing dual factor authentication suffer from deficiencies and limitations that limit the realization of their full potential and effectiveness.
 First, if the token uses the same internally stored password to log into a large number of systems, anyone having that password would gain access to the entire system. On the other hand, if every system had a unique password, the token would need to store all of the passwords which would require more internal memory inside the device and still limit the number of systems that could be accessed.
 Second, once a system has been secured by a token, if the token is lost or damaged, access to the system is lost along with protected data and information.
 Third, current systems do not provide a scheme whereby access protected by a security token device can be managed in such a way that users can be organized into security groups, and each member of a group can share access to computers, servers, or protected facilities.

BRIEF SUMMARY OF THE INVENTION

In view of the above described state of the art, the present invention seeks to realize the following objects and advantages.

It is an object of the present invention to provide means of dual factor authentication that will allow a security token device to control access to an unlimited number of Secure Systems, which could be computers, servers, other data storage devices or facilities, each requiring a unique password, without the usual requirement for storing each password inside of the security token.

It is another object of the present invention to provide means of dual factor authentication that will allow a security token device to control access to an unlimited number of Secure Systems in such a manner that the Secure Systems can also be unlocked by a designated Master Security Token in the event that the original security token is not available thereby preventing the loss of resource resulting from a lost or damaged token.

It is a further object of the present invention to provide means of dual factor authentication that will allow a security token device to control access to an unlimited number of Secure Systems in such a manner that the Secure Systems can also be unlocked by a designated Grand Master Security Token in the event that the original security token and the Master Security Token are not available thereby preventing the loss of resource resulting from a lost or damaged token.

It is yet another object of the present invention to provide means of dual factor authentication that will allow a security token device to control access to an unlimited number of Secure Systems in such a manner that the Secure Systems can also be unlocked by authorized groups of users in a manner designed and chosen by the owner of the security token.

These and other objects and advantages of the invention will become more fully apparent from the description and claims which follow, or may be learned from the practice of the invention.

In the present invention a portable token device is used, such as a USB token or a smart card, which has the ability to connect to a computer, and to process and store data securely inside the device. The token has the ability to store one or more secrets that can be used to encrypt and decrypt data passing through the token. These stored secrets cannot be read from the token, but only used by the token. In use, the token device creates a random number which will be used as a password for the purpose of logging into a specified computer or secure resource. The random number is used to secure a user account on the computer. The token device then uses a secret previously stored inside the token to encrypt the random number. The encrypted random number is then saved on the computer to be available as an encrypted version of the password or as a Hidden Secret.

When the user attempts to log into the computer, the token requires the user to enter a PIN (Personal Identification Number) to verify that the user is authorized to use the token. This PIN is often the same no matter what computer the user is trying to log into. If the user correctly enters the PIN, the token receives the Hidden Secret (encrypted version of the login password) that was previously stored on the computer during the step of locking the user account. Inside of the token, the device uses its internally stored secret to decrypt the Hidden Secret which can then be transferred back to the computer as the login password, and access is granted.

In its preferred embodiments, the present invention includes a means for providing a secure, dual authentication login to a Windows computer. In the practice of the invention, the login password or the decryption key is stored in the open on the computer, but in a form that has been encrypted by a secret permanently stored inside the token. In use, the token uses the internally stored secret to decrypt the Hidden Secret thereby gaining access to the login password needed to access the secure resource.

The use of the Hidden Secret method thus deployed, allows the system to provide additional secure access to resources by a master and by a grand master token in the event that the owner of the original token has forgotten the PIN or in the case that the token has been damaged or lost. This system also allows members of designated user groups to access the secure login to the computer.

BRIEF DESCRIPTION OF THE DRAWINGS

In order to better appreciate how the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 1:
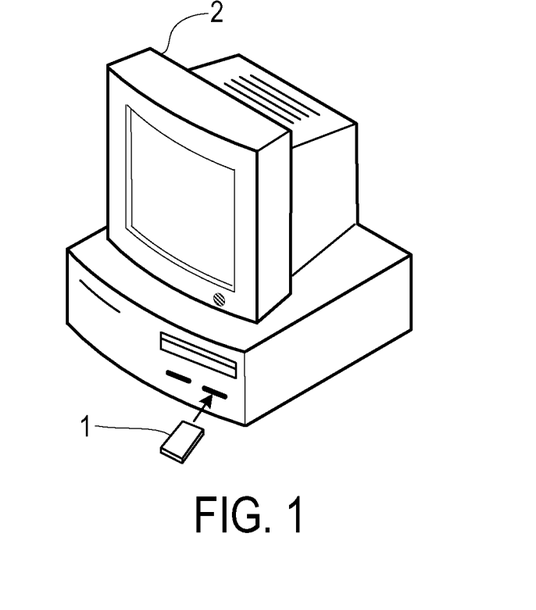
FIG. 1 is a perspective view illustrating the insertion of a USB token into a Windows computer.
Figure 2:
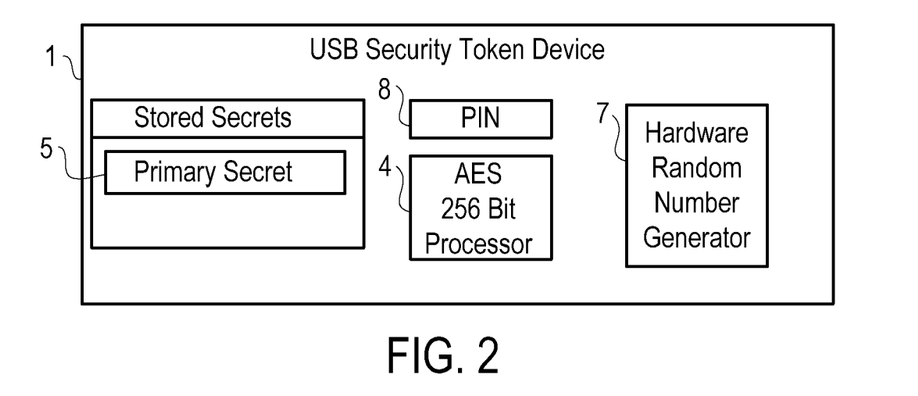
FIG. 2 is a block diagram of registers and functionality inside the token device.

Reference will now be made to the drawing wherein like structures will be provided with like reference designations. Referring first to FIG. 1, a USB security token device 1 is inserted into a USB port on a Windows XP computer 2. The security token 1 has been implemented according to the principles of the present invention, and as such, has the ability to securely store secrets. In the example of the preferred embodiments of the invention, the security secrets are used as Advanced Encryption Standard (AES) keys to facilitate "strong" encryption. AES strong encryption keys are 256 bits in length and are used to encrypt and decrypt data, passwords and other information. FIG. 2 shows the secrets that are stored inside of each token. The Primary Secret 5 is programmed into the device during the registration process which will be described later. It is unique to each token, and is the secret used primarily by that device. The token also can store other secrets, the use of which will also be described later. Access to the secrets is protected by a user PIN 8 or secret code which must be provided by the user to unlock the token. The token also has an internal AES 256 processor 4 to perform AES 256 bit encryption and decryption of data using one of the stored secrets. The device also has a 256 bit hardware random numbers generator 7 which is used to create secrets as required when the user token 1 is used to perform the security functions.

In one example of the preferred embodiments (see FIG. 3), the token is used to secure login to a Windows XP computer 2. Before a user account is secured, special software must be installed. During the software installation, a new security DLL is added to the Windows system files. For the example of Windows XP, a new GINA DLL file is specified, which performs the function of logging users into the system by allowing them to enter their user passwords. The modified version of the GINA DLL provides the ability to integrate the login process with the use of the token device. After the software has been installed on the computer, a user may secure one or more accounts on the computer using the security token or tokens.

Figure 3:
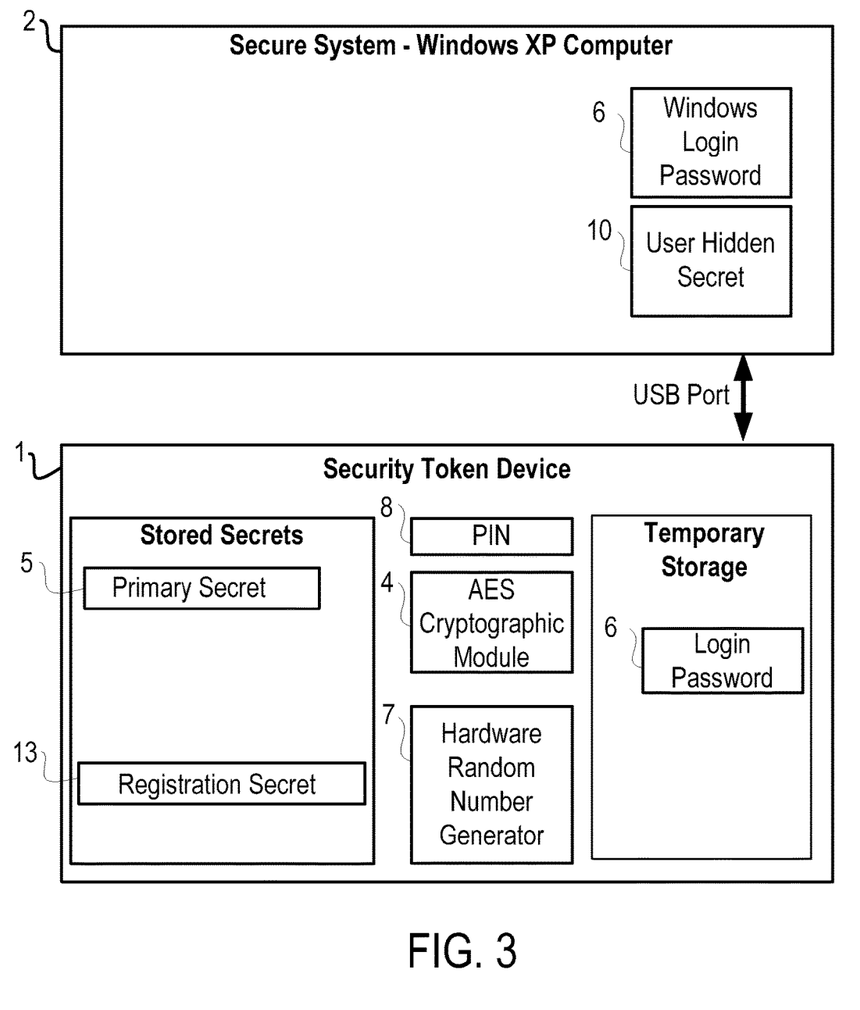
FIG. 3 is a block diagram showing the relationship of the token device to a Windows computer.

During the process of using the token to secure, or "lock", a user account, a random number is generated inside the token hardware. The new random number is registered with Windows as the password 6 needed to login to the user account. The password is longer than would be used conventionally by a user, and can be more random, possibly even consisting of some characters that cannot be entered at a keyboard. It is not necessary for the user to learn or know the new password. The random number, which is now the user's password for this Windows computer, is AES encrypted inside the token 1. The AES encryption key used to encrypt the Windows password is the Primary Secret 5 which was already stored inside the user token. The resulting encrypted password 10 is then given to the modified GINA for storage on the Windows computer. The encrypted version of the password 10 that is stored on the computer is called the User Hidden Secret 10 since although it is stored in the open on the computer, it cannot be used to log into the computer without first being decrypted inside the token 1.

When the user wishes to login to the Windows computer after a user account has been secured, the token is inserted into the computer and the modified GINA DLL prompts the user to enter the PIN 8 associated with the token. The entered PIN is transferred into the token where it is compared with the internally stored PIN 8 value for a match. If it does match, the user token 1 receives the Hidden Secret 10, which is the encrypted login password that the modified GINA had stored on the computer when the account was secured. The user token 1 decrypts the Hidden Secret 10 using its internally stored, Primary Secret 5. The plain-text, decrypted password is given from inside the token, back to the Windows machine via the USB port where it is used by the GINA DLL as the login password.

As can be seen, the token can, by this method, secure an unlimited number of Windows computers with "strong" passwords. The login password for every machine is unique and completely random, and yet none of the passwords are stored inside of the user token 1. Instead, each password is stored right in the open on the Windows computer as a User Hidden Secret 10.

In addition to the ability of being able to lock user accounts on an unlimited number of computers, the Hidden Secret implemented according the principles of the present invention, provides the ability to allow access to the locked computer by other tokens under certain conditions. Other tokens having access to the locked account on the Windows computer are the Master Token, the Grand Master Token, and registered Group tokens.

Figure 4:
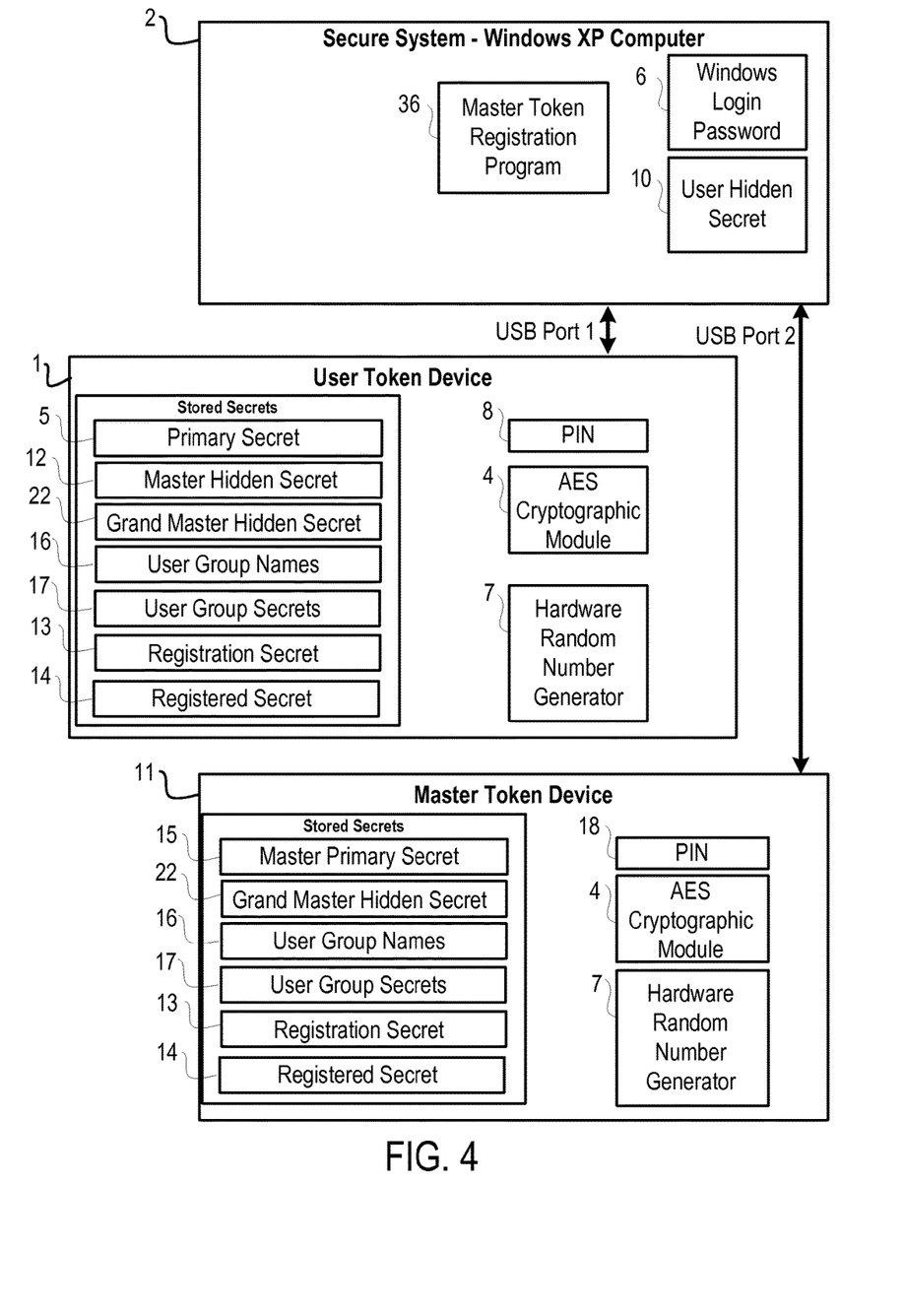
FIG. 4 is block diagram representing the registration of a user token with a Master token using software installed on a Windows computer.

In order to facilitate the Master Token feature using the teachings of the invention, the user's token 1 must be registered with the Master Token 11 before the Windows user account is secured (refer to FIG. 4). The step of registering a user token 1 with a Master Token 11 would usually be performed when the token is assigned to a user.

In the preferred embodiments of the invention, a Master Token Registration Program 36 is run on a computer into which the user token 1 and the Master Token 11 have both been inserted into USB ports. To secure the registration process, a pre-learned Registration Secret 13 is programmed into every token at the time of manufacture. The Registration Secret 13 is used to encrypt communications between the tokens during the beginning of the registration process.

Figure 5:
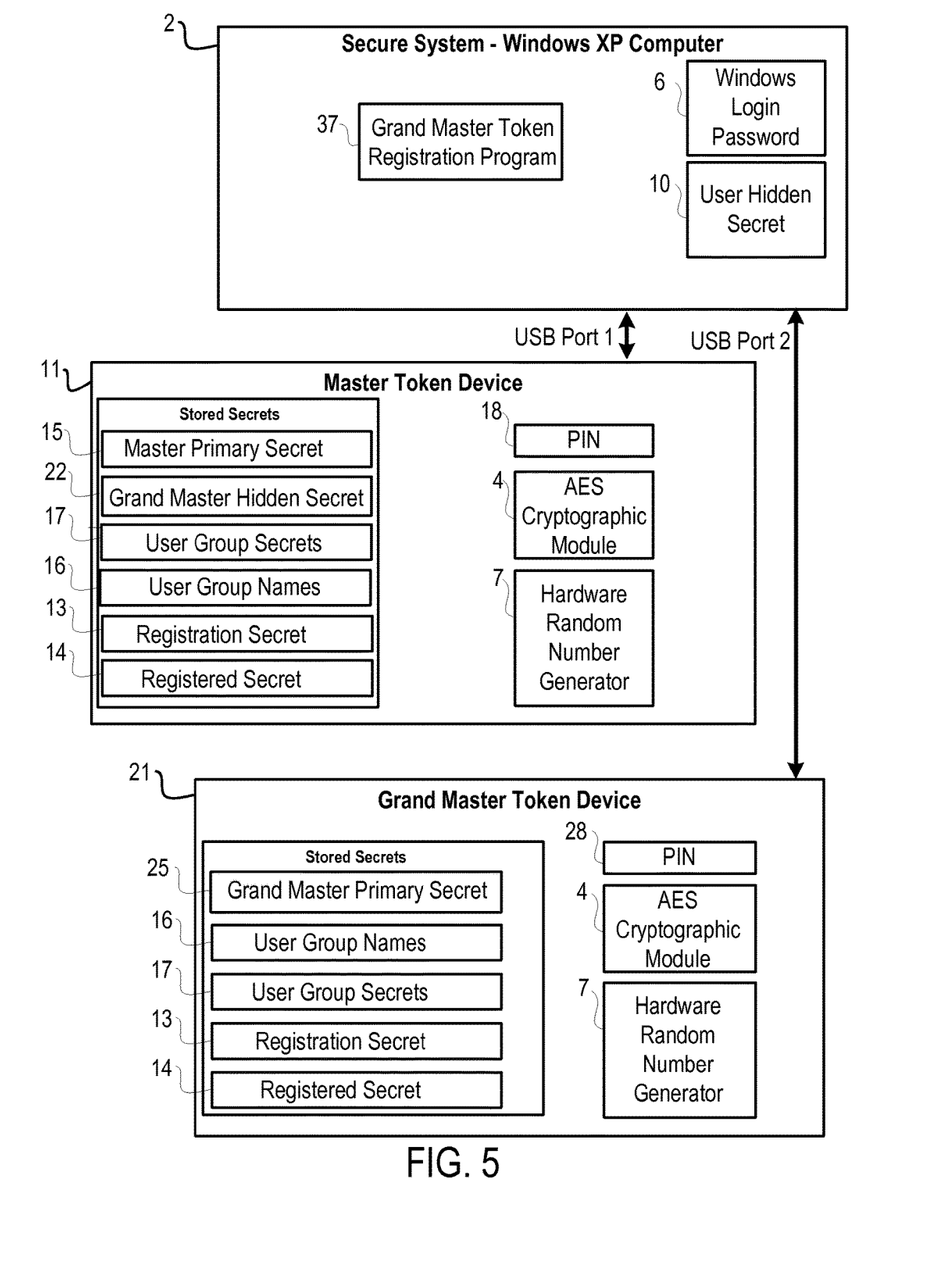
FIG. 5 is a block diagram depicting the registration of a Master token with a Grand Master token.

In a preferred embodiment of the invention, prior to the registration of security tokens with the Master Token, the Master Token is registered with the Grand Master Token (see FIG. 5). The Grand Master Token can be used to register an unlimited number of Master Tokens, each of which can be used to register an unlimited number of user security tokens.

In the preferred embodiments of the invention, the following tasks are performed during the registration process.

Task 1—Configuring Grand Master Token

The Grand Master Token is configured to be able to manage all of the Master Tokens in an organization. In practice, duplicate Grand Master Tokens might be used to provide redundancy in the event that a Grand Master Token is lost or destroyed. The step of configuring the Grand Master Token entails storing information in the Grand Master which will be used to program Master Tokens. There are three steps included in this task:

a.) Personalize Grand Master Token

The Grand Master Token user PIN or Personal Identification Number 28 is programmed into the device. The PIN is created by the user and loaded into the Grand Master Token by connecting the token to a computer 2 and by executing the Grand Master Token Registration Program 37.

b.) Initialize Security Question

A security question is created and stored in the Grand Master Token along with the correct answer which will enable the user to access the higher security functions of the token such as the function to change the PIN or to register Master Tokens. The Grand Master Token Registration Program 37 is used to program the security question and to add any other biometric information such as fingerprints or iris scans which can be used to secure access to the features of the token.

c.) Create User Groups

User Groups are created and programmed into the Grand Master Token. The User Groups provide a simple, secure, and reliable method of managing access to Secure Systems through the use of Hidden Secrets and Registered secure tokens. Each of the User Groups is assigned a User Group Name 16 by the operator, and a encryption key is generated by the Hardware Random Number Generator 7 and is stored inside the Grand Master Token as the User Group Secret 17. The creation of User Groups, and programming them into the Grand Master Token is accomplished by the Grand Master Token Registration Program 37.

Although these specific steps are provided as illustrative of the preferred embodiment, it will be seen by a person skilled in the art that other steps and details could be used to satisfy specific needs or applications. In very security sensitive applications, for example, biometric data stored in the Grand Master Token could be compared inside the token, to data scanned from a user as an additional safeguard required to unlock the functions of the token.

Task 2—Registering Master Tokens with the Grand Master Token

After the Grand Master Token is configured, it can be used to register Master Tokens. The process of registering will prepare Master Tokens to be able to register user tokens in such a manner that the Grand Master Token will be able to access Secure Systems which have been secured by registered tokens. It will also allow the owner of the Grand Master Token to be able to establish User Group access to Secure Systems. To register a Master Token with the Grand Master Token (see FIG. 5), both tokens are simultaneously connected to a computer such as a Windows XP Computer 2 which is running the Grand Master Token Registration Program 37. Registration of the Master Tokens involves the following steps:

a.) Programming New Registered Secret

The Registration Secret 13 is used by the Grand Master Token 21 to encrypt communications to the Master Token 11. The encrypted communications can safely be sent through the programming computer 2 and can be decrypted inside Master Token 11 by use of the Registration Secret 13. By this means, the Grand Master Token 21 can securely write a new Registered Secret 14 to Master Token 11. The Registered Secret 14 is used to secure communication for the rest of the registration process. When a Master Token's Registered Secret is changed, all other secret data on the Master Token 11 is automatically erased.

b.) Programming Master Primary Secret and Grand Master Hidden Secret

Using the internal Hardware Random Number Generator 7, the Grand Master Token 21 generates a new Master Primary Secret 15 and sends it to be stored in the Master Token 11. The Grand Master Token 21 then uses its own internal Grand Master Primary Secret 25 to encrypt the Master Primary Secret 15, creating a Grand Master Hidden Secret 22 version of the Master Primary Secret 15. The Grand Master Hidden Secret 22 version of the Master Primary Secret 15 is also sent over the secure link to the Master Token 11 where it is stored as the Grand Master Hidden Secret 22. The purpose of storing a copy of the Master Primary Secret 15 that has been encrypted by the Grand Master Primary Secret 25 is to allow the Grand Master Token 21 access to Secure Systems which have been secured by security tokens that have been registered to registered Master Tokens as will become apparent.

c.) Programming User Groups

The Grand Master Token Registration Program 37 then displays a list of User Group Names 16 which were previously configured into the Grand Master Token by the user. Each selected User Group Name 16 and associated User Group Secret 17 is now stored in the Master Token 11. New User Group Names 16 can also be created by the user and stored inside the Master Token 11. For each new User Group Name 16, an associated User Group Secret 17 is generated randomly by the Hardware Random Number Generator 7 and stored inside the Master Token 11 along with any User Group information downloaded from the Grand Master Token 21. The User Group Names 16 and the User Group Secrets 17 will allow the Master Token 11 to program User Group privileges into security tokens as will be described hereafter.

d.) Personalize Master Token

The Master Token 11 user PIN 18 is programmed into the device. The PIN 18 is created by the user and loaded into the Master Token 11 by connecting the token to a computer such as a Windows XP Computer 2 and by executing the Grand Master Token Registration Program 37.

e.) Initialize Security Question

A security question is created and stored in the Master Token 11 along with the correct answer which will enable the user to access the higher security functions of the token such as the function to change the PIN 18 or to register security tokens. The Grand Master Token Registration Program 37 or the Master Token Registration Program 36 is used to program the security question into the Master Token 11 and to add any other biometric information such as fingerprints or iris scans which can be used to secure access to the features of the token.

In a similar manner, the Grand Master Token can be used to make duplicate copies of Master Tokens 11 or to make alternative Master Tokens 11 that are managed by the same Grand Master Token 21, but which can be assigned to separate departments. In this manner, complex security strategies can be securely managed.

Task 3—Registering User Tokens with Master Token

After the Master Token 11 is registered with the Grand Master Token 21, or alternatively, after the Master Token 11 has been manually configured in a procedure similar to the configuration of the Grand Master Token 21 in Task 1 above, it is ready to be utilized to program User Tokens 1. By registering the User Tokens 1 with the Master Token 11, it will be possible for the Master Token 11 to access Secure Systems that have been configured for access by any of the User Tokens 1. In the event that the Master Token 11 was previously registered with a Grand Master Token 21 as described in Task 2, then the Grand Master Token 21 will also be able to access Secure Systems configured for access by any registered User Tokens 1. The registration process will also allow the owner of the Master Token 11 to establish User Group access privileges for each User Token 1.

To register a User Token 1 with a Master Token 11 (see FIG. 4), both tokens are simultaneously connected to a computer such as a Windows XP Computer 2 which is running the Master Token Registration Program 36. Registration of the User Tokens 1 involves the following steps:

a.) Programming New Registered Secret

The Registration Secret 13 is used by the Master Token 11 to encrypt communications to the User Token 1. The encrypted communications can safely be sent through the USB ports of the programming Computer 2 and can be decrypted inside User Token 1 by use of the Registration Secret 13. By this means, the Master Token 11 can securely write a new Registered Secret 14 to User Token 1. The Registered Secret 14 is used to secure or encrypt communication for the rest of the registration process. When a User Token's Registered Secret is changed, all other secret data on the User Token 1 is automatically erased.

b.) Programming Primary Secret

Using the internal Hardware Random Number Generator 7, the Master Token 11 generates a new Secret and sends it via the communications link to be stored inside the User Token 1 as the Primary Secret 5.

c.) Programming Master and Grand Master Hidden Secrets

The Master Token 11 then uses its own internal Master Primary Secret 15 to encrypt the Primary Secret 5, thereby creating a Master Hidden Secret 12 version of the Primary Secret 5. The Master Hidden Secret 12 version of the Primary Secret 5 is also sent over the secure link to the User Token 1 where it is stored as the Master Hidden Secret 12.

The Grand Master Hidden Secret 22 which was stored in the Master Token during the registration process with the Grand Master Token 21 is also sent to the User Token 1 for storage. In the event that the Master Token was not previously registered with the Grand Master Token 21, the registration of the Grand Master Hidden Secret 22 inside the User Token 1 is not possible and the features of the Grand Master Token 21 are not available to the User Token 1.

d.) Programming User Groups

The Master Token Registration Program 36 then displays a list of User Group Names 16 which were previously configured into the Master Token 11 by the user or during the registration of the Master Token 11 with the Grand Master Token 21. Each selected User Group Name 16 and associated User Group Secret 17 is now stored in the User Token 1.

e.) Personalize User Token

The user token 1 can optionally be personalized at this time. The personalization process allows the user to select a PIN for the token, and to enter other personal information that will be used by the user token 1 to verify the user in the event that the user wishes later to change the PIN number or other personal information.

The registration process is completed when the Master Hidden Secret 12, the Grand Master Hidden Secret 22, and the User Groups Secrets 17 have been securely programmed into the user token 1. It is important to note that it is not necessary to write or modify any information inside the Master Token 11 during the process of registering a user token 1. Consequently, there is no limit to the number of user tokens 1 that can be registered with a single Master Token 11, nor is there any limit to the number of Master Tokens that can be registered with a Grand Master Token 21.

After completion of the registration process, the user token 1 can be used to secure a user account on a Windows computer as described previously. Since the user token 1 has now been registered with a Master Token 11, the process of securing the user account on the Windows machine can also provide support for a Master or even a Grand Master token to access the account. To accomplish this, when the user token 1 is giving the GINA DLL the encrypted version of the login password to be stored on the Windows computer, it can also give GINA the Master Hidden Secret 12 and the Grand Master Hidden Secret 22 which can be stored in the open on the computer.

Figure 6:
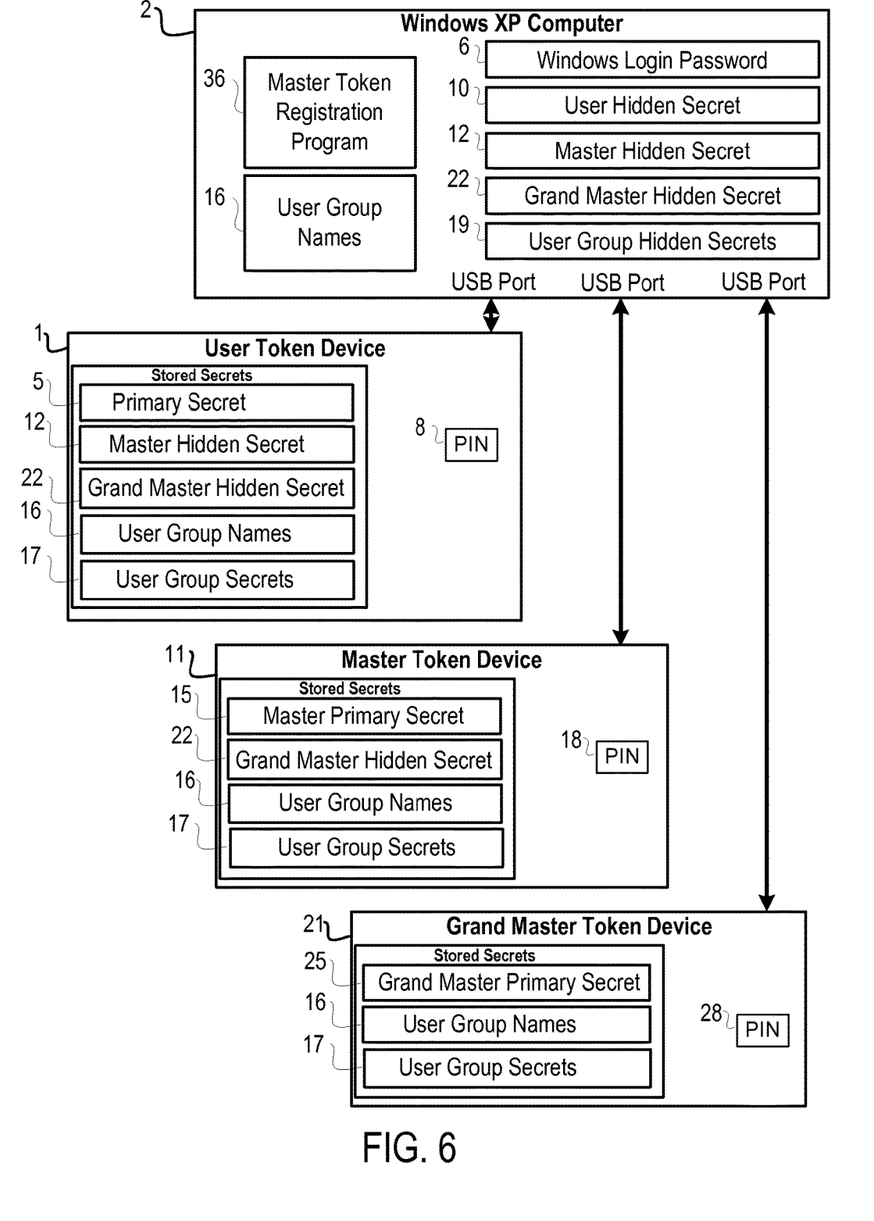
FIG. 6 is a detailed block diagram representing the use of the tokens to access a secured Windows computer by the User Token, the Master Token, the Grand Master Token, and by members of various user groups.

After the user account on the Windows computer has been secured by a user token 1 that has previously been registered with a Master Token 11, the owner of the Master Token 11 or the owner of the Grand Master Token 21 can unlock the user account (see FIG. 6).

When the owner of the Master Token 11 wishes to login to the Windows computer, the Master Token 11 is inserted into the computer and the modified GINA DLL prompts the user to enter the PIN 18 associated with the Master Token 11. The entered PIN is transferred inside the token 11 where it is compared with the internally stored PIN value for a match. If it does match, the Master Token 11 receives the Hidden Secret 10 which is the encrypted login password that the modified GINA program has stored on the computer. It also receives the Master Hidden Secret 12, a copy of which was also stored by the GINA DLL during the process of securing the user account.

The Master Token 11 uses its Primary Secret 15 to decrypt the Master Hidden Secret 12, which when decrypted, is the Primary Secret 5 of the user key 1 that secured the user account. Using this Primary Secret 5, the Master Token 11 is able to now decrypt the Hidden Secret 10 for this account thereby obtaining the Windows password that was used to secure the account. When the correct Windows password is delivered to the GINA DLL, the Windows account is opened.

The process is similar for the owner of the Grand Master Token, except that an additional step is required. In addition to reading the Hidden Secret 10 and the Master Hidden Secret 12 from GINA, the Grand Master also reads the Grand Master Hidden Secret 22, which is the Master Primary Secret 15 of the Master Token 11 encrypted by the Grand Master Primary Secret 25 of the Grand Master Token. Since it knows the Grand Master Primary Secret 25, it can decode the Master's Primary Secret 15 from the Grand Master Hidden Secret 22, and then continue to obtain the needed Windows password in the same way it is obtained by the Master Token 11 above.

In a similar manner, the user token 1 may use the User Group Secrets 17 it has stored to allow access to other user tokens. Which groups will be allowed to access the account can be chosen by the user at the time the account is initially secured. This is done by adding one more step to the previously described process of securing the user account on the Windows computer. In this additional step, the same Windows password 6 is also encrypted using each User Group Secret 17 that corresponds to a user group that should have access to the account. The resulting User Group Hidden Secrets 19 will also be sent to the GINA DLL for open storage in a manner similar to the other "Hidden" passwords. Thereafter, any user token which received the appropriate User Group Secret 17 during the registration process, can receive from the Windows computer 2 the User Group Hidden Secret 19 which it can then decrypt using the associated User Group Secret 17 thereby obtaining the login password 6 and gaining access to the account.

In view of the foregoing, it will be appreciated that the present invention's feature of using Hidden Secrets to secure and manage access to a Windows computer could in a similar manner be utilized to secure access to a remote server or even some other device or facility.

Figure 7:
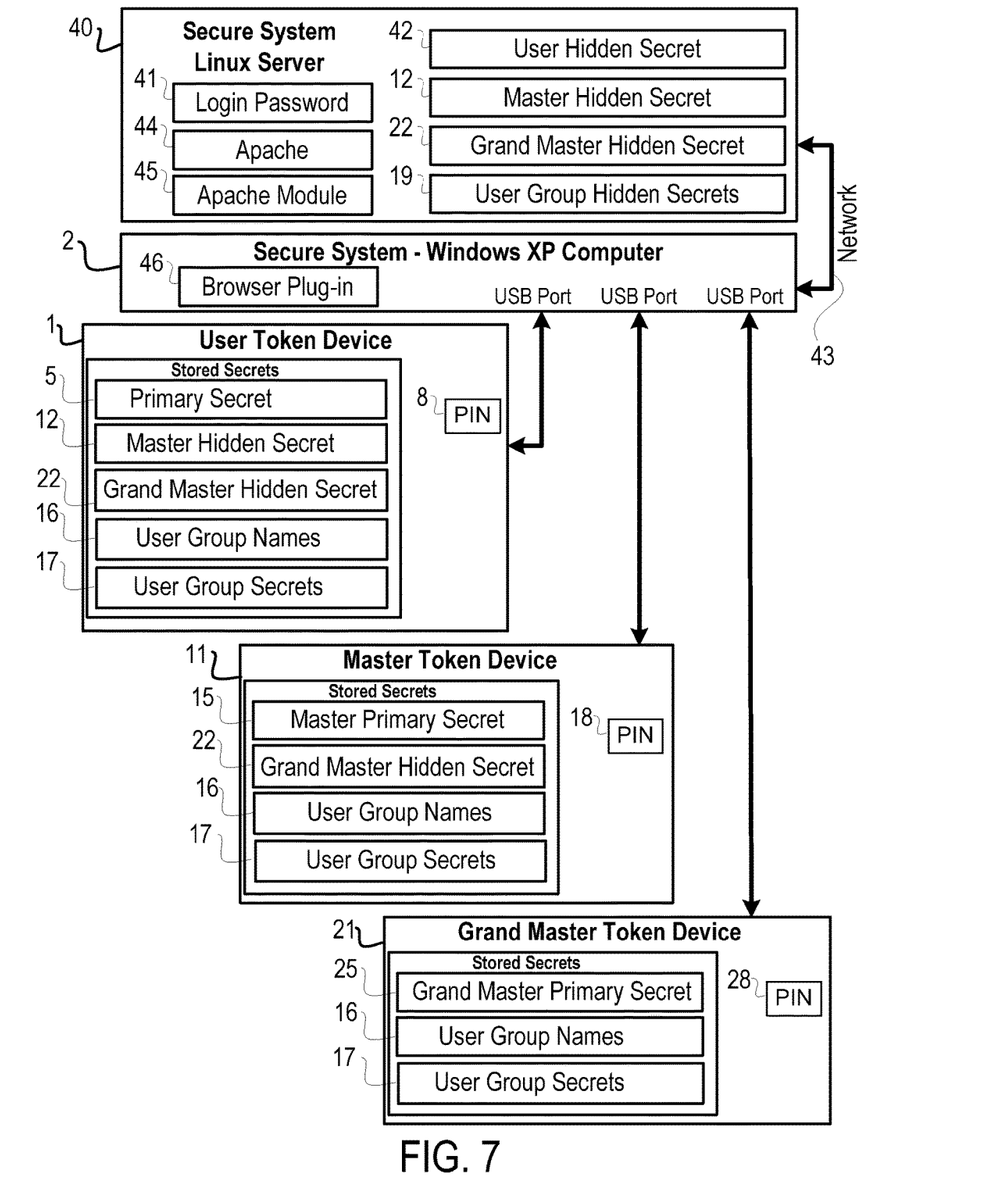
FIG. 7 is a detailed block diagram representing the use of the tokens to access a secured Linux Server by the User Token, the Master Token, the Grand Master Token, and by members of various user groups.

In another example of the preferred embodiments, a user account can be secured on a remote server using the security token and hidden secrets (see FIG. 7). In this example the User Token 1 is connected to a personal computer such as the Windows XP Computer 2 of the previous example. The Computer 2 is in turn, connected to the remote Linux Server 40 over a network 43 such as an Ethernet network.

Before a user account on the Linux Server 40 is secured, special software must be installed on the Computer 2 which will provide a secure connection between the User Token 1 and the remote Server 40. For the example of Windows XP, a Browser Plug-in 46 could be installed in Windows Internet Explorer. The Plug-in 46 would provide the ability to integrate the login process with the use of the token device. A similar program must also be installed on the Linux Server 40, which in the case of this example would be an Apache Module 45 which would support the log-in process on the Server. After the software has been installed on the Computer 2 and the Server 40, a user may secure one or more accounts on the computer using the security token or tokens.

During the process of using the token to secure, or "lock", a user account, a random number is generated inside the token hardware. The new random number is registered with the Server 40 as the password 41 needed to login to the user account. The password is longer than would be used conventionally by a user, and can be more random, possibly even consisting of some characters that cannot be entered at a keyboard. It is not necessary for the user to learn or know the new password. The random number, which is now the user's password for this Server 40, is AES encrypted inside the token 1. The AES encryption key used to encrypt the password is the Primary Secret 5 which was already stored inside the user token. The resulting encrypted password 42 is then given to the Apache Module 45 for storage on the Server 40. The encrypted version of the password 42 that is stored on the Server 40 is called the User Hidden Secret 42 since although it is stored in the open on the Server 40, it cannot be used to log into the Server without first being decrypted inside the User Token 1.

When the user wishes to login to the Linux Server after a user account has been secured, the IP address or the web name of the Server is entered into the Web Browser on the XP Computer 2. Upon connection over the network to the Server, the user is prompted to insert the User Token 1 into the Computer 2, and the user is prompted to enter the PIN 8 associated with the token. The entered PIN is transferred into the token where it is compared with the internally stored PIN 8 value for a match. If it does match, the user token 1 receives the Hidden Secret 42, which is the encrypted login password that has been stored on the Server 40 when the account was secured. The user token 1 decrypts the Hidden Secret 42 using its internally stored, Primary Secret 5. The plain-text, decrypted password is given from inside the token, back to the Windows machine via the USB port where it is conveyed via the Browser Plug-in 46 over the network to the Server 40 where it is used by the Server 40 as the login password.

As can be seen, the token can, by this method, secure an unlimited number of Servers with "strong" passwords. The login password for every machine is unique and completely random, and yet none of the passwords are stored inside of the user token 1. Instead, each password is stored right in the open on the Server 40 as a User Hidden Secret 42.

In addition to the ability of being able to lock user accounts on an unlimited number of servers, the Hidden Secret implemented according the principles of the present invention, provides the ability to allow access to the locked server by other tokens under certain conditions. Other tokens having access to the locked account on the Server 40 are the Master Token 11, the Grand Master Token 21, and User Tokens 1 with registered user group membership.

After the user account on the Server 40 has been secured by a user token 1 that has previously been registered with a Master Token 11, the owner of the Master Token 11 or the owner of the Grand Master Token 21 can unlock the user account (see FIG. 7).

When the owner of the Master Token 11 wishes to login to the Linux Server after a user account has been secured, the IP address or the web name of the Server is entered into the Web Browser on the XP Computer 2. Upon connection over the network to the Server, the user is prompted to insert the Master Token 11 into the Computer 2, and the user is prompted to enter the PIN 18 associated with the token. The entered PIN is transferred into the token where it is compared with the internally stored PIN 18 value for a match. If it does match, the Master Token 11 receives the User Hidden Secret 42, which is the encrypted login password that has been stored on the Server 40 when the account was secured.

It also receives the Master Hidden Secret 12, a copy of which was also stored on the Server 40 during the process of securing the user account.

The Master Token 11 uses its Primary Secret 15 to decrypt the Master Hidden Secret 12, which when decrypted, is the Primary Secret 5 of the user key 1 that secured the user account. Using this Primary Secret 5, the Master Token 11 is able to now decrypt the User Hidden Secret 42 for this account thereby obtaining the password that was used to secure the account. When the correct password is delivered to the Server 40, the user account is opened.

The process is similar for the owner of the Grand Master Token, except that an additional step is required. In addition to reading the Hidden Secret 42 and the Master Hidden Secret 12 from the Server 40, the Grand Master also reads the Grand Master Hidden Secret 22, which is the Master Primary Secret 15 of the Master Token 11 encrypted by the Grand Master Primary Secret 25 of the Grand Master Token 21. Since it knows the Grand Master Primary Secret 25, it can decode the Master's Primary Secret 15 from the Grand Master Hidden Secret 22, and then continue to obtain the needed login password in the same way it is obtained by the Master Token 11 above.

In a similar manner, the user token 1 may use the User Group Secrets 17 it has stored to allow access to other user tokens. Which groups will be allowed to access the account can be chosen by the user at the time the account is initially secured. This is done by adding one more step to the previously described process of securing the user account on the Server 40. In this additional step, the same Server Login Password 41 is also encrypted using each User Group Secret 17 that corresponds to a user group that should have access to the account. The resulting User Group Hidden Secrets 19 will also be sent to the Server 40 for open storage in a manner similar to the other "Hidden" passwords. Thereafter, any user token which received the appropriate User Group Secret 17 during the registration process, can receive from the Linux Server 40 the User Group Hidden Secret 19 which it can then decrypt using the associated User Group Secret 17 thereby obtaining the Login Password 41 and gaining access to the account.

The fact that each server can be secured with a unique password, and yet that a user token can be utilized to unlock an unlimited number of computers without the cumbersome need to store each and every password provides advantages not previously available in the industry. The present invention also allows an unprecedented level of access to secured resources by holders of Master Tokens, Grand Master Tokens, and even members of designated user groups without the inherent vulnerabilities associated with alternative strategies and back doors. The present invention provides a more effective and secure method of balancing security with usability, allowing users a robust and standards based solution to protect vital assets while yet maintaining an adequate alternative access solution should the need arise.

What we claim is:

1. A system for securing access to one or more secure systems comprising:
   a security token device having an interface and configured to enable a user to obtain access to a secure system, wherein the security token device is configured to receive user's command to activate the security token device using an unlock function through the interface;
   a primary secret is stored within the security token device, wherein the primary secret is not accessible external to the security token device and never leaves the security token device, wherein the security token device is configured to encrypt random number to generate a hidden secret, and the hidden secret is stored in an open or an unencrypted part of the secure system; and wherein when performing the unlock function, the security token device is configured to receive the hidden secret from the secure system and is configured to utilize the primary secret to decrypt the hidden secret; the security token device is configured to transfer the decrypted hidden secret back to the secure system as a login password; and the user is granted access to the secure system; wherein a master hidden secret is stored inside the security token device so as to be accessible from the secure system, wherein the master hidden secret is decrypted by a master token; wherein the security token device includes a random number generator for generating, with the security token device, the login password.

2. The system for securing access to one or more secure systems of claim 1, wherein the interface is configured to communicate with a Universal Serial Bus (USB) port of the secure system.

3. The system for securing access to one or more secure systems of claim 1, wherein the security token device is configured as a smart card.

4. The system for securing access to one or more secure systems of claim 1, further comprising a grand master hidden secret that is stored inside the security token device so as to be accessible from the secure system, wherein the grand master hidden secret is decrypted by a grand master token.

5. The system for securing access to one or more secure systems of claim 1, further comprising a user group secret that is stored inside the security token device and used by the security token device to generate a group hidden secret from the login password based upon the user group secret.

6. The system for securing access to one or more secure systems of claim 1, further comprising a registration secret stored inside the security token device for enabling secure programming of the security token device by a master token, a grand master token, or a master token and a grand master token.

7. The system for securing access to one or more secure systems of claim 1, further comprising a Personal Identification Number (PIN) stored within the security token device and configured by the user, wherein the PIN is provided via the interface to operate the security token device.

8. The system for securing access to one or more secure systems of claim 1, further comprising personalization information, stored inside the security token device and configured by the user.

9. A method for controlling access to a secure system comprising the steps of:
   performing an unlock function for a security token device;
   configuring access control to the secure system by the further steps of:
   having the security token device generate a login password;
   registering, via an interface of the security token device, the login password with the secure system to allow access to the secure system;
   creating a hidden secret by encrypting the login password by using a cryptographic module of the security token device and a primary secret stored inside the security token device as an encryption cipher; and storing, via the interface, the hidden secret, in an open or an unencrypted part of the secure system; gaining access to the secure system by the further steps of:

loading, via the interface, the hidden secret from the secure system, into the security token device;

decrypting, within the cryptographic module, the hidden secret, using the stored primary secret, to recreate the login password; and sending, via the interface, the login password to the secure system to gain access to the secure system; using a random number generator of the security token device is used to generate a random number that forms a login password, and reading a master hidden secret from the security token device; and storing, via the interface, the master hidden secret in an open or an unencrypted part of the secure system as part of a file on the secure system; wherein the master hidden secret allows a master token to access the secure system using the primary secret.

10. The method of claim 9, further comprising the steps of:

reading a grand master hidden secret from the security token device; and storing, via the interface, the grand master hidden secret in an open or an unencrypted part of the secure system as part of a file on the secure system;

wherein the grand master hidden secret allows a grand master token to access the secure system using the master hidden secret and the primary secret.

11. The method of claim 9, further comprising the steps of:

creating a group hidden secret by encrypting the login password using a cryptographic module of the security token device and the user group secret stored within the security token device as an encryption cipher; and storing, via the interface, the group hidden secret in a file that is not encrypted on the secure system; wherein each of the group hidden secrets allow an authorized group member token to access the secure system.

* * * * *